United States Patent Office 3,447,617
Patented June 3, 1969

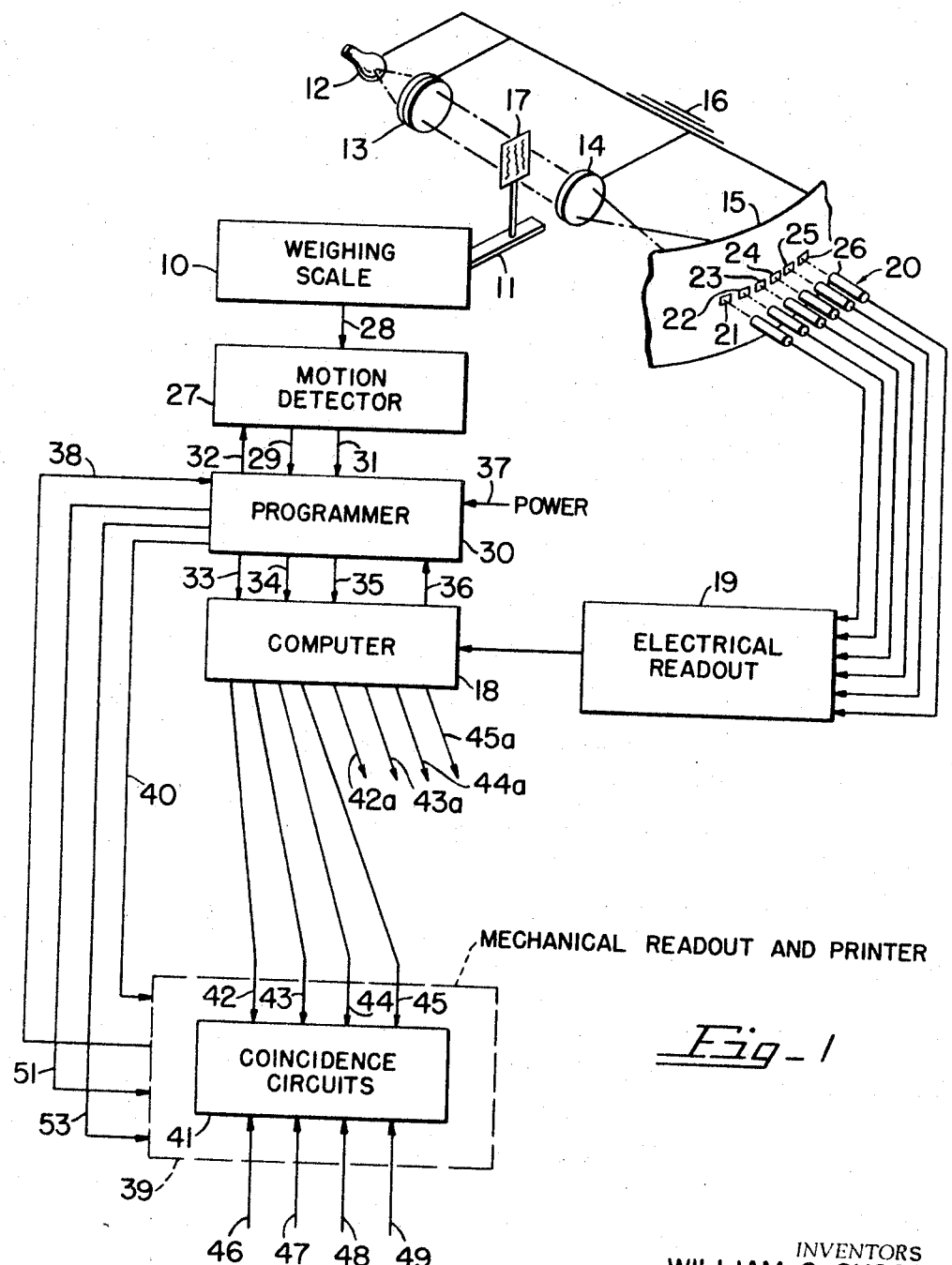

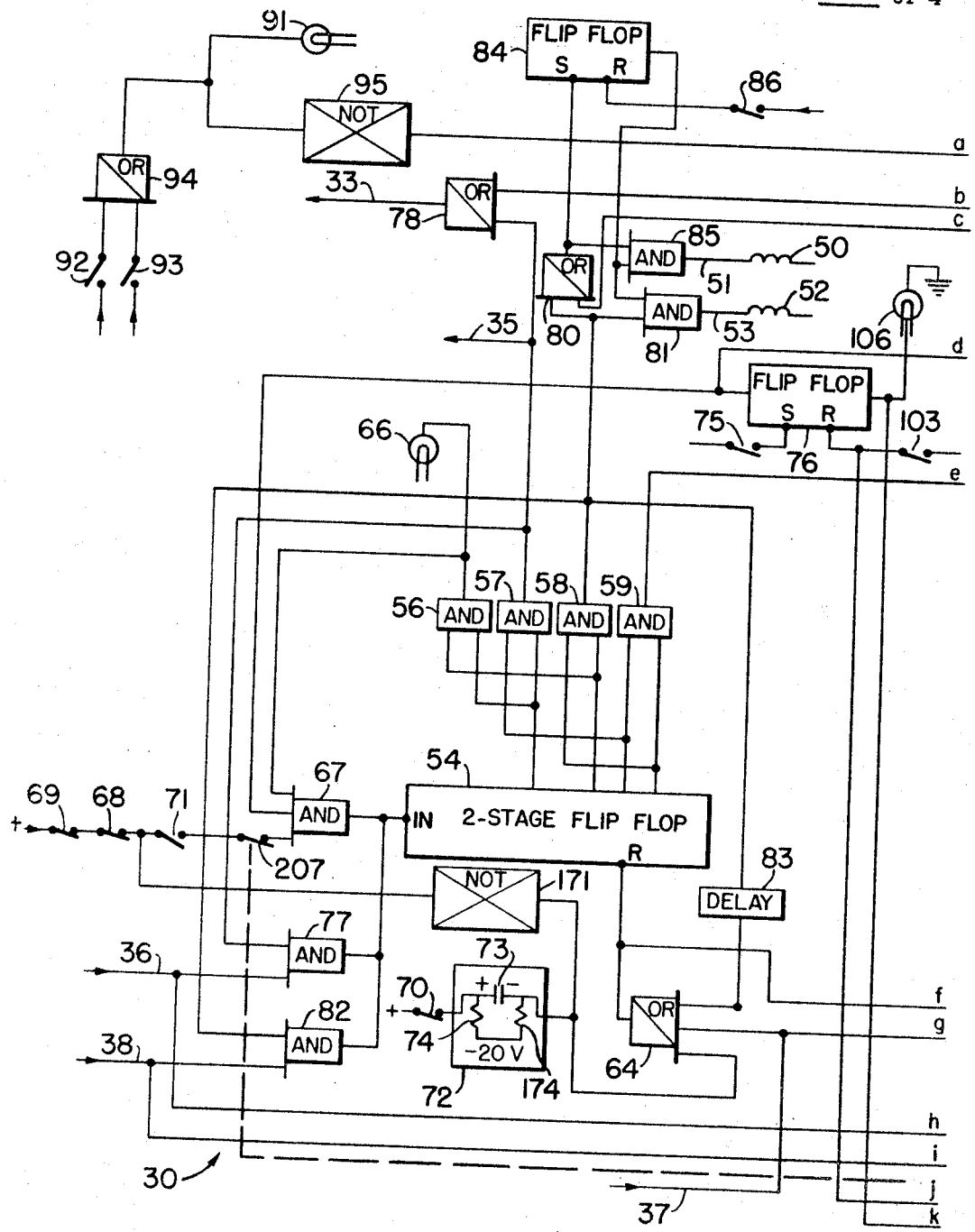
Fig_2
INVENTORS
WILLIAM C. SUSOR
ORVAL J. MARTIN
Thomas H. Grafton
ATTORNEY

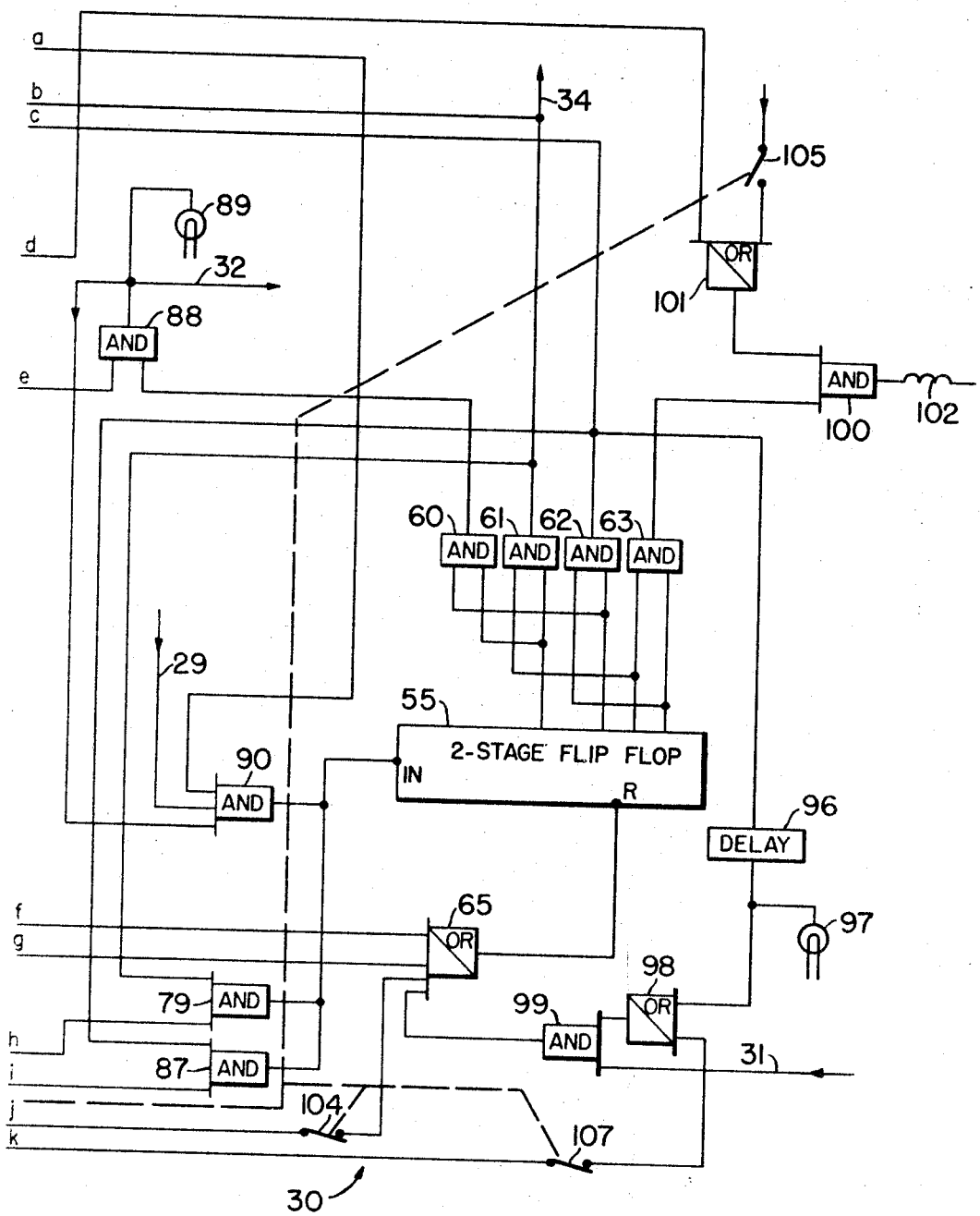

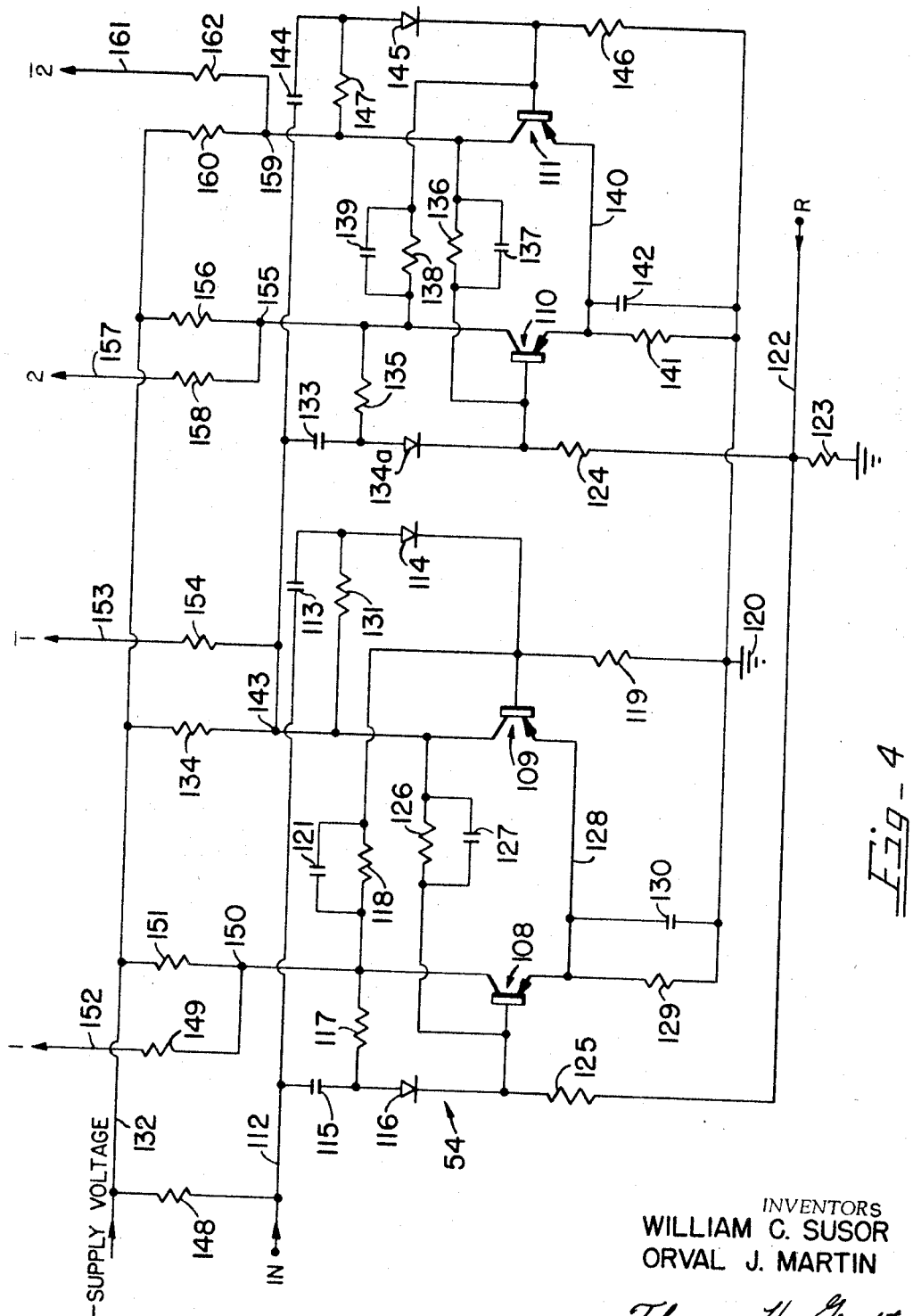

3,447,617
CONTROL CIRCUITRY FOR DISCRIMINATING PRICE COMPUTATION
William C. Susor and Orval J. Martin, Toledo, Ohio, assignors, by mesne assignments, to The Reliance Electric and Engineering Company, Toledo, Ohio, a corporation of Ohio
Original application Feb. 1, 1965, Ser. No. 429,230, now Patent No. 3,384,193, dated May 21, 1968. Divided and this application Apr. 7, 1967, Ser. No. 629,292
Int. Cl. G01g 23/38
U.S. Cl. 177—3                  3 Claims

ABSTRACT OF THE DISCLOSURE

An automatic computing and printing scale having an excess value interlock which is responsive to predetermined combinations of inserted unit price and weight for preventing value computation based on such combinations.

---

This application is a division of Patent No. 3,384,193 issued May 21, 1968 in the names of William C. Susor and Orval J. Martin, and the invention specifically relates to the excess value interlock (D) below.

This invention generally relates to an improved programmer combined in an automatic weighing, computing and printing system of the type disclosed in U.S. Patent No. 3,163,247 issued Dec. 29, 1964 in the names of R. E. Bell and D. B. Kendall. The programmer features the use of two two-stage flip flops to program the system and in addition to operational interlocks and signals for the overall circuit operation includes nine system interlocks and signals, namely:

(A) Change price or tare or commodity name plate—programmer resets and set name, price, tare and lock light lights—push lock button and see that price, tare and commodity plate are in operate positions to restart programmer—change in price or tare or commodity plate does not force secondary change in other;

(B) Mechnical readout not setting up properly to print price—resets the programmer and lights a light;

(C) If label not taken plus scale motion exists, programmer resets—prevents double weight label on one package;

(D) Excess value interlock—if certain combinations of predetermined price and weight exist then excess value light comes on and system not allowed to compute;

(E) Take label light responsive to the printing of a ticket which stays on until ticket is taken;

(F) Power on-off interlock which causes the programmer to reset if power lost during any part of cycle;

(G) Locks price mechanically into commutators of mechanical readout until a signal received from programmer to unlock and enter a new price—system must be reset before new price can be entered; and (H) Printer mode interlock—operator must properly set printer mode switch before operation controlled by the programmer can take place.

The objects of this invention are to improve load measuring devices, to increase the precision of such devices, to simplify the construction of such devices, and to provide system interlocks and signal for the control of automatic weighing, computing and printing systems.

The above and other objects and features of this invention will be appreciated more fully from the following detailed description when read with reference to the accompanying drawings wherein:

FIG. 1 is a schematic diagram illustrating the general organization of the weighing, computing and printing system which the solid state programmer of the invention combined therewith;

FIGS. 2 and 3 are block diagrams of the programmer shown in FIG. 1; and

FIG. 4 is a schematic diagram of one of the two two-stage flip flops shown in block form in FIGS. 2 and 3.

Referring to FIG. 1, a computing weighing scale 10 includes a lever 11 and an optical projection system which diagrammatically includes a light source 12, a condensing lens 13, a projection lens 14 and a photocell mask 15. The light source 12, the lenses 13 and 14, and the mask 15 are connected to ground as shown at 16 (e.g., base of weighing scale), the mask 15 being rigidly mounted with respect to the projection optics. A coded chart 17 is moved by the load-responsive lever 11 in the optical projection system, the chart 17, hence, being condition responsive. A computer 18 receives weight information from the scale and multiplies the weight of an article upon the scale by the unit price of such article to compute the value of such article. The computer 18 also multiplies such unit price times one so that it can produce a unit price output The computer 18 may be of any kind having an input which is compatible with the parallel 1-2-4-8 binary coded decimal output of an electrical readout 19 in circuit therewith. The complete description of an analog to digital converter is not necessary to a full understanding of this invention. The above combination of weighing scale, optical projection system, electrical readout and computer is shown in U.S. application Ser. No. 416,524, filed Dec. 7, 1964, in the name of R. A. Willyard now Patent 3,289,777, issued Dec. 6, 1966.

The chart 17 has a matrix of coded markings arranged invertical bands so that the relative position thereof may be read by a bank of readout photocells 20, with one cell being associated with each column, providing an indication of the weight upon the scale. The output of the photocells is applied to the electrical readout 19, which makes available weight information to the input of the computer 18. The mask 15 is shown as being slitted at 21–26 so that a small and clearly defined portion of the projected image of the chart 17 is permitted to fall on each of the sensitive grids of the photocells, i.e., the mask screens out unwanted chart bits (the projection lens 14 projects all of the bits in its field of view). There is a total of fourteen photocells in the photocell bank 20, only six of the fourteen photocells being shown for the sake of simplicity. Fourteen photocells are enough to read out a chart capacity of 25.00 pounds.

The weighing scale 10 is connected operatively to a motion detector 27 through a connection 28 as also shown in the above U.S. Patent No. 3,163,247, the motion detector preventing erroneous weight readouts from taking place when the weighing mechanism is in motion as described in the patent. The motion detector 27 applies no motion signals through a lead 29 to the programmer 30 of the invention. The counterpart of the programmer 30 in the system shown in the above patent is identified as "CONTROL UNIT" in FIG. I and is shown in detail in FIGS. XXII–XXIV. The programmer 30 is a solid state logic circuit and the control unit shown in such patent is a relay logic circuit. The motion detector 27 also applies motion signals through a lead 31 to the programmer 30 and receives conditioning signals from the programmer 30 through a lead 32.

The programmer 30 applies reset signals and command to compute signals through leads 33, 34 and 35, respectively, to the computer 18 and receives program advance signals through a lead 36 from the computer 18. The programmer 30 also receives power on signals through a lead 37 and coincidence check signals through a lead 38. The coincidence check signals indicate that the computer 18 and the readout positions of the number wheels in a mechanical readout and printer 39 agree. Similar coincidence check signals are generated in the check circuit shown in FIG. XVI of the above U.S. Patent No. 3,163,247, i.e., AND circuit 740 in the patent FIG. XVI is responsive to coincidence of the count in the counter 734 and the read out positions of the number wheels in the readout device 738 for generating a check signal. The programmer 30 also applies a signal through a lead 40 to the mechanical readout and printer 39 commanding it to print.

The counterpart of the mechanical readout part of the mechanical readout and printer 39 is shown in detail in the above U.S. Patent No. 3,163,247. However, the programmer 30 of the invention is used advantageously in conjunction with an improved mechanical readout which is disclosed in U.S. application Ser. No. 416,526, filed Dec. 7, 1964, in the name of C. E. Adler, and assigned to the assignee of this application. The improved readout includes a combination of a series of modules each comprising a detent wheel which is directly gear connected to a commutator and to a print wheel. Each module indicates the digits of a particular denominational order and is of unit construction, so that the modules each can be readily removed as a unit to be serviced or to be replaced. When the turning print wheel approaches the correct indicating position, a stopping latch intercepts the correct one of the teeth of the detent wheel to arrest the detent wheel. Such improved readout also includes coincidence circuits 41 which receive 1-2-4-8 binary coded unit price signals from the computer 18 through leads 42-45 and 1-2-4-8 binary coded decimal signals through leads 46-49 indicative of the positions of the commutators. The detent wheels and thus the print wheels are stopped when the coincidence circuits determine that the wheels are in the correct indicating positions. The improved readout also includes a solenoid 50 (FIG. 2) which when it receives a signal through a lead 51 (FIGS. 1 and 2) permits a new reading to be made and a solenoid 52 (FIG. 2) which when it receives a signal through a lead 53 (FIGS. 1 and 2) unlocks the unit price indicating modules which otherwise remain locked to accomplish repeat printing without recycling such unit price indicating modules. Similarly, the coincidence circuits 41 receive 1-2-4-8 binary coded decimal value signals from the computer 18 through leads 42a-45a and 1-2-4-8 binary coded decimal signals through leads, not shown, indicative of the positions of the commutators.

Although the various logic circuits mentioned herein are in common use in the electronic control field, a brief description of the function of each circuit is as follows. An AND logic circuit produces an output signal when, and only when, all of a plurality of input signals are present. A NOT logic circuit produces an output signal at all times unless an input signal is present. A MEMORY logic circuit, sometimes known as a flip flop or bistable circuit has "ON" and "OFF" or reset input terminals, and "ON" and "OFF" output terminals. The MEMORY or bistable circuit produces an "ON" output signal in response to a signal applied at the "ON" input terminal and continues to produce the "ON" output signal, even though the input signal at the "ON" input terminal is removed, until a signal is applied to the "OFF" input terminal. The MEMORY circuit will then be turned "OFF" and produce an "OFF" output signal even though the signal at the "OFF" input terminal is removed. The MEMORY circuit will revert to its initial state upon application of a signal to the "ON" input terminal. An OR logic circuit produces an output upon receiving an input signal at any of a plurality of input terminals. For further details on the construction and operation of various types of logic circuits reference is made to an article entitled "Static Switching Devices," by Robert A. Mathias, in Control Engineering, May 1957. All of the logic circuits mentioned hereinafter, such as gates and flip flops, and the switches and time delay circuits are of conventional type. The connections between said circuits and switches are clearly shown in FIGS. 2 and 3 and will not be described in detail.

The heart of the programmer 30 is two two-stage flip flops 54 (FIG. 2) and 55 (FIG. 3), the entire programmer 30 being shown in FIGS. 2 and 3 and being divided at lead ends $a$—$a$ through $k$—$k$. The two stage flip flops 54 and 55 (described in detail hereinafter in connection with FIG. 4) each may be considered as half of a conventional 1-2-4-8 binary coded decimal counter which counts to three by the following code:

| 1 | 2 | 4 | 8 | Count | Binary Output |
|---|---|---|---|-------|---------------|
| 0 | 0 | 0 | 0 | 0 | 1 2—not 1 not 2 |
| 1 | 0 | 0 | 0 | 1 | 1 2—true 1 not 2 |
| 0 | 1 | 0 | 0 | 2 | 1 2—not 1 true 2 |
| 1 | 1 | 0 | 0 | 3 | 1 2—true 1 true 2 |

Each of the two-stage flip flops 54 and 55 has an input terminal "IN" and a reset terminal "R." In the reset or zero count condition of two-stage flip flop 54, two signals are applied by the two-stage flip flop to an AND gate 56, at count 1, two signals are applied to an AND gate 57, at count 2, two signals are applied to an AND gate 58, and at count 3, two signals are applied to an AND gate 59. Only one of the AND gates 56–59 can be enabled at any one time. A reset signal on terminal "R" returns the two-stage flip flop 54 to its reset condition no matter what count is in the two-stage flip flop. The two-stage flip flop 55 functions similarly to enable AND gates 60–63. Two-stage flip flop 54 programs the setup of the weighing, computing and printing system to ready it for weighing. Two-stage flip flop 55 programs the operation of the system from the time motion of the weighing mechanism has stopped to the printing of a ticket, label or the like.

The weighing, computing and printing system is readied for weighing by turning on the power (lead 37, FIGS. 1 and 2). This applies inputs to an OR gate 64 in FIG. 2 and to an OR gate 65 in FIG. 3. The resulting outputs from the OR gates 64 and 65 are applied to the respective reset terminals R of the two-stage flip flops 54 and 55 to reset the two-stage flip flops. This is interlock (F) above, i.e., the power on-off interlock which causes the programmer to reset if power is lost during any part of the cycle (interrupts the cycle of operations and restores the system to condition for starting a new operation). In the reset condition of the two-stage flip flops 54, the AND gate 56 is enabled and its output turns on a set name, price, tare and lock lamp 66 and partially enables an AND gate 67.

Lamp 66 lighting is a signal to the operator to set the commodity name plate in the machine, turn the price knobs or set the price levers, as described in the above U.S. Patent No. 3,163,247, set tare into the system, and push a lock or reset button 71. This closes switches 68, 69 and 70, respectively, and closes the lock button 71 momentarily. Change in a price or tare or commodity plate setting interrupts the cycle of operations. Closing of the switches 68 and 69 and the lock button 71 further enables the AND gate 67, i.e., conditions the start of the cycle. Closing of the switches 68 and 69 applies an input to a NOT gate 171 which therefore does not apply an input to the OR gate 64. The switch 70 when closed normally does not apply an input to the OR gate 64 because of an intervening resistor-capacitor circuit 72. When the price knob is turned and the switch 70 opens, a capacitor 73 in the circuit 72, connected through resistors 74 and 174 to a minus 20 volts power supply, discharges quickly through both of the resistors. When the price knob reaches an integer value position, and the switch 70 is thereby closed, a voltage spike is applied to the OR gate 64 to reset the two-stage flip flop 54, and thereafter the capacitor 73 charges through the resistor 174 thereby removing the output of the resistor-capacitor circuit 72 from the OR gate 64. Hence, the turning of the price knob causes reset, but not until the knob reaches an integer value position. This is interlock (A) above, i.e., the change price or tare or commodity name interlock. If the commodity name plate switch 68 or the tare switch 69 is opened, the NOT gate 171 loses its input and applied its resulting output to the input of the OR gate 64 to reset the two-stage flip flop 54, or if the price switch 70 is opened and then closed at an integer value position the resulting voltage spike is applied to the input of the OR gate 64 to reset the two-stage flip flop 54. The lamp 66 then tells the operator to push the lock button 71 and see that the switches 68-70 are closed. Accordingly, a change in price or tare or commodity name plate resets the two-stage flip flop 54, the interlock featuring restarting of the system without changing price or tare or commodity name other than the one the change in which reset the two-stage flip flop 54.

Turning on the power (lead 37), setting the name, price and tare, and pushing the lock button 71 applied two inputs to the AND gate 67. If the operator has closed a normally open switch 75 by removing the previously printed label from the tray into which it is delivered by the printer to apply a signal to a set terminal S of a flip flop 76, an output of the flip flop 76 is applied as a third input to the AND gate 67 enabling it. The enabled AND gate 67 applies an input signal to the IN terminal of the two-stage flip flop 54 advancing it to its count one position (two inputs applied to the AND gate 57—no double inputs applied to the AND gates 56, 58 and 59). Lamp 66 now goes out and the AND gate 57 is enabled. "Price" is used hereinafter as the value of a unit, e.g., ten cents per pound or three bunches for one dollar.

The output of the enabled AND gate 57 performs three functions; it partially enables an AND gate 77; it causes a reset signal through the lead 33 (FIGS. 1 and 2) to be applied to the computer 18, an OR gate 78 being in circuit between the lead 33 and the AND gate 57; and it applies a command to compute signal through the lead 35 (FIGS. 1 and 2) to the computer 18. The computer then multiplies the selected unit price times one and applies a 1-2-4-8 binary coded decimal unit price signal through the leads 42-45 (FIG. 1) to the coincidence circuits 41 (FIG. 1) to set up the mechanical readout and printer 39. When computation is finished, the computer 18 applies an advance signal through the lead 36 (FIGS. 1 and 2) to an AND gate 79 (FIG. 3) partially enabling it and to the partially enabled AND gate 77 enabling it to advance the two-stage flip flop 54 to its count two position (two inputs applied to the AND gate 58 enabling it—on double inputs applied to the AND gates 56, 57 and 59).

The enabled AND gate 58 enables an OR gate 80, partially enables AND gates 81 and 82, and applies an input signal to a time delay circuit 83. The enabled OR gate 80 applies an input signal to a set terminal S of a flip flop 84 to set the flip flop 84 and partially enables an AND gate 85. The output from the set flip flop 84 completely enables the AND gates 81 and 85 and both of the mechanical readout solenoids 50 and 52 are energized. As above described, energization of solenoid 50 permits a new reading to be made and energization of solenoid 52 unlocks the unit price indicating modules which otherwise remain locked to accomplish repeat printing without recycling the unit price indicating modules. The solenoids 50 and 52 remain energized until the mechanical readout closes a normally open limit switch 86 soon after it starts its cycle. Closing of the limit switch 86 applies an input signal to a reset terminal R of the flip flop 84 to reset the flip flop 84. The output from the flip flop 84 then ceases and the AND gates 81 and 85 are disabled and the solenoids 50 and 52 are de-energized. The function of the flip flop 84 is to ensure that the solenoids 50 and 52 remain energized until the limit switch 86 is closed. The mechanical readout continues its cycle and the print wheels are set up in accordance with the unit price of the commodity to be weighed. However, the readout cycle must take place before a time delay provided by the delay circuit 83 expires. If such is not the case, e.g., if one of the mechanical readout wheels gets stuck, the delay circuit 83 applies on input signal to the OR gate 64 which in turn applies an input signal to the reset terminal R of the two-stage flip flop 54 to reset the two-stage flip flop 54. As described above, if the computer 18 and the readout positions of the number wheels in the mechanical readout and printer 39 agree, a coincidence check signal is applied to the lead 38 (FIGS. 1 and 2). The coincidence check signal partially enables an AND gate 87 and completely enables partially enabled AND gate 82.

The output from the enabled AND gate 82 is applied to the IN terminal of the two-stage flip flop 54 advancing it to its count three position (two inputs applied to the AND gate 59 enabling it—no double inputs applied to AND gates 56-58). The enabled AND gate 59 applies an input signal to an AND gate 88 (FIG. 3) which already is partially enabled by the output from the AND gate 60 (two-stage flip flop 55 reset to enable the AND gate 60 by the power on signal applied to the OR gate 65 or by the output of the OR gate 64 which is applied as an input to the OR gate 65). The output signal from the enabled AND gate 88 conditions the motion detector 27 through a lead 32 (FIGS. 1 and 3) in preparation for the next cycle, lights a ready lamp 89, and partially enables an AND gate 90. The ready lamp 89 being on is a signal to the operator that the system is ready for weighing and that he may put a package to be weighed upon the weighing scale 10 (FIG. 1). When motion of the weighing mechanism ceases after change in load, the motion detector 27 applies an input signal through the lead 29 (FIGS. 1 and 3) to further partially enable the AND gate 90.

As above described, the computer 18 receives weight information from the scale and multiplies the weight of an article upon the scale by the unit price of such article to compute the value of such article. However, if certain combinations of predetermined price and weight exist, an excess value light 91 comes on and the computation is prevented (value beyond capacity of system). This is accomplished by the excess value interlock (D) above. The price setting means closes normally open limit switches 92 and 93 when the unit price is set between $5.00-$9.00 and $4.00-$9.00, respectively. If the electrical readout 19 senses 10 pounds or more upon the scale, an input is applied through the switch 92, if it is closed, to an OR gate 94. If the electrical readout 19 senses 20 pounds or more upon the scale, an input is applied through the switch 93, if it is closed, to the OR gate 94. If excess value does not exist, the OR gate 94 applies no input signal to a NOT gate 95 and it in turn applies an input signal to completely enable the AND gate 90. Enabling of the AND gate 90 therefore means that there is no excess value, that weighing motion has stopped and that the AND gate 88 is signaling that the two-stage flip flop 54 is in its fully advanced count three position and that the two-stage flip flop 55 is in its reset position ready to go, i.e., the cycle is ready for computation of the value of the package upon the scale.

The enabled AND gate 90 applies an input signal to the input terminal IN of the two-stage flip flop 55 advancing it to its count one position (two inputs applied to the AND gate 61 enabling it—no double inputs applied to the AND gates 60, 62 and 63). The output of the enabled AND gate 61 partially enables the AND gate 79, causes an input signal to be applied to the OR gate 78 which in turn puts an input signal on the lead 33 resetting the computer 18, and applies a command to compute signal through the lead 34 (FIGS. 1 and 3) to the computer 18. The computer then multiples the unit price times the weight of the package upon the scale and applies a 1-2-4-8 binary coded decimal unit price signal through the leads 42a-45a (FIG. 1) to the coincidence circuits 41 (FIG. 1) to set up the mechanical readout and printer 39. When computation is finished, the computer 18 applies an advance signal through the lead 36 to the partially enabled AND gate 79 enabling it to advance the two-stage flip flop 55 to its count two position (two inputs applied to the AND gate 62 enabling it—no double inputs applied to the AND gates 60, 61 and 63).

The enabled AND gate 62 applies an input signal to the AND gate 87 partially enabling it, applies an input signal to a time delay circuit 96, and applies an input signal to the OR gate 80. The enabled OR gate 80 applies an input signal to the set terminal S of the flip flop 84 to set the flip flop 84 and partially enables the AND gate 85. The output from the set flip flop 84 completely enables the AND gate 85 but only partially enables the AND gate 81. Accordingly, the mechanical readout solenoid 50 becomes energized and the solenoid 52 remains deenergized. As above described, energization of solenoid 50 permits a new reading to be made and remains energized until the mechanical readout closes the limit switch 86 soon after it starts its cycle. Closing of the limit switch 86 applies an input signal to the reset terminal R of the flip flop 84 to reset the flip flop 84. The output from the flip flop 84 then ceases and the AND gate 85 is disabled and the solenoid 50 is deenergized. The mechanical readout continues its cycle and the print wheels are set up in accordance with the computed value of the weighed commodity. However, the readout cycle must take place before a time delay provided by the delay circuit 96 expires. If such is not the case, a reweigh lamp 97 lights and the delay circuit 96 applies an input signal to an OR gate 98 which in turn applies an input signal to an AND gate 99. A motion signal from the motion detector 27 applied on the lead 31 (FIGS. 1 and 3) completely enables the partially enabled AND gate 99 and its output is applied as an input to the OR gate 65 which in turn applies an input to the reset terminal R of the two-stage flip flop 55 resetting it. This is interlock (B) above, i.e., the mechanical readout not setting up properly causes the reweigh light 97 to light and this plus scale motion resets the two-stage flip flop and forces the operator to remove the package from the scale and then reapply it to the scale (interrupts the cycle of operations and restores the system to condition for starting a new operation). As described above, if the computer 18 and the read out positions of the number wheels in the mechanical readout and printer 39 agree, a coincidence check signal is applied to the lead 38 which completely enables the partially enabled AND gate 87.

The output from the enabled AND gate 87 is applied to the IN terminal of the two-stage flip flop 55 advancing it to its count three position (two inputs applied to the AND gate 63 enabling it—no double inputs applied to AND gates 60–62). The enabled AND gate 63 applies an input signal to an AND gate 100 enabling it provided it has been partially enabled by the operator having closed the normally open switch 75 (FIG. 2) by removing the previously printed label to apply a signal to the set terminal S of the flip flop 76, the resulting output signal from the flip flop 76 being applied to an OR gate 101 which in turn applies an input signal to the AND gate 100.

The enabled AND gate 100 applies an input signal to a print solenoid 102 in the mechanical readout and printer 39 and the ticket, label or the like is printed. After printing has been completed, a limit switch 103 is closed by the printer applying a signal to the reset terminal R of the flip flop 76 resetting the flip flop and a signal through a closed switch 104 to the OR gate 65. For repeat printing, i.e., continuous mode, the switch 104 is open and switches 107 and 207 also are open, while a switch 105 is closed. These four switches are shown as being mechanically connected by broken lines an are operated by means of a selectively operable printer mode control switch (not shown) being turned to automatic or continuous mode. For automatic operation, i.e., operation controlled by the programmer, switches 104, 107 and 207 are closed and switch 105 is opened. When price or tare or commodity setting is changed (reset flip-flop 54) before the operator goes back to automatic operation, the switch 207 must be closed before the lock button 71 is operable to complete the circuit to the AND gate 67 and start the cycle. This is an interlock which forces the operator to properly set the printer mode switch when he changes from repeat printing to automatic operation (interlock H above). The OR gate 65 then applies a signal to the reset terminal R of the two-stage flip flop 55 to reset the two-stage flip flop. The flip flop 76 applies a signal to a lamp 106 signaling the printed label is ready for the operator and applies a signal through the contacts 107 to the OR gate 98 which in turn applies an input to the AND gate 99 partially enabling it. This is interlock (E) above, i.e., the take label light 106 is responsive to the printing of a ticket and stays on until the ticket is taken.

The printed label being in the tray partially enabled the AND gate 99 (output from the flip flop 76 enabled the OR gate 98 which applied an input to the AND gate 99). The AND gate 99 is enabled completely by a motion signal from the motion detector 27 on the lead 31. The output signal from the enabled AND gate 99 enables the OR gate 65 which in turn applies a signal to the two-stage flip flop 55 resetting it (interrupts the cycle of operations and restores the system to condition for starting a new operation). This is interlock (C) above, i.e., if a printed label is in the tray and scale motion exists, the two-stage flip flop 55 is reset to prevent a double weight label getting on one package. This could otherwise occur by the operator putting a second package on the scale before the first package is removed. A double weight label might be printed and placed upon the second package. However, when the first package is removed, the motion signal caused thereby on the lead 31 plus the printed label for the first package being in the tray causes the two-stage flip flop 55 to be reset to start the computation cycle over for the second package.

As described, energization of solenoid 52 unlocks the unit price indicating modules which otherwise remain locked to accomplish repeat printing without recycling the unit price indicating modules. The solenoid 52 remains energized until the mechanical readout closes the switch 86 soon after it starts its cycle. Closing of the switch 86 applies an input signal to the reset terminal R of the flip flop 84 to reset the flip flop. The output from the flip flop 84 then ceases and the AND gate 81 is disabled and the solenoid 52 is deenergized. This is interlock (G) above, i.e., the price is mechanically locked into the mechanical readout until a signal is received from the two-stage flip flop 54 to unlock and enter a new price (price unlock solenoid 52 energized by signal from the AND gate 58 partially enabling the AND gate 81 and enabling the OR gate 80 which in turn causes the flip flop 84 to be set—the set flip flop 84 applies a signal to the AND gate 81 enabling it). The two-stage flip flop 54 must be reset before a new price can be entered.

Each of the 2-stage flip flops or bistable circuits 54 and 55 is alike. Accordingly, only the 2-stage flip flop 54 will be described in detail. The 2-stage flip flop 54 consists of two flip flops, the second of which is driven by the first. The first flip flop includes two transistors 108 and 109. The second flip flop includes two transistors 110 and 111. The input terminal IN (FIGS. 2 and 4) is in a lead 112 which is connected through a capacitor 113 and a diode 114 to the base of the transistor 109. The lead 112 also is connected through a capacitor 115 and a diode 116 to the base of the transistor 108. The junction between the capacitor 115 and the diode 116 is connected through resistors 117, 118 and 119 to ground 120. A capacitor 121 is connected across the resistor 118. The reset terminal R (FIGS. 2 and 4) is in a lead 122 which is connected to ground through a resistor 123, to the base of the transistor 110 through a resistor 124, and to the base of the transistor 108 through a resistor 125. The base of the transistor 108 is connected to the collector of the transistor 109 through a resistor 126, there being a capacitor 127 connected across the resistor 126. The emitters of the transistors 108 and 109 are connected by means of a lead 128, the lead 128 being connected to the ground 120 through a resistor 129. A capacitor 130 is connected across the resistor 129. The junction between the capacitor 113 and the diode 114 is connected to the collector of the transistor 109 through a resistor 131. A negative supply voltage is supplied to a lead 132 which is connected to a capacitor 133 through a resistor 134. The capacitor 133 is connected to the base of the transistor 110 through a diode 134a and to the collector of the transistor 110 through a resistor 135. The base of the transistor 110 is connected to the collector of the transistor 111 through a resistor 136, there being a capacitor 137 across the resistor 136. The collector of the transistor 110 is connected to the base of the transistor 111 through a resistor 138, there being a capacitor 139 across the resistor 138. The emitters of the transistors 110 and 111 are connected together by means of a lead 140 which is connected to the ground 120 through a resistor 141. A capacitor 142 is connected across the resistor 141. The junction point 143 at the resistor 134 is connected to the base of the transistor 111 through a capacitor 144 and a diode 145. The base of the transistor 111 also is connected to the ground 120 through a resistor 146. The junction between capacitor 144 and the diode 145 is connected to the collector of the transistor 111 through a resistor 147. A resistor 148 is connected between leads 112 and 132. A resistor 149 is connected to a junction point 150 at a resistor 151 and to an output lead 152, the junction point 150 being between the resistor 151 and the collector of the transistor 108. The other side of the resistor 151 is connected to the lead 132. The junction point 143 is connected to an output lead 153 through a resistor 154. The junction point 155 between the collector of the transistor 110 and a resistor 156 is connected to an output lead 157 through a resistor 158. The other side of the resistor 156 is connected to the lead 132. A junction point 159 between the collector of the transistor 111 and a resistor 160 is connected to an output lead 161 through a resistor 162. The other side of the resistor 160 is connected to the lead 132.

The flip flops are reset into predetermined states by the application of a positive signal to the reset terminal R. This signal is in turn applied through the lead 122 to the resistors 124 and 125. This reset signal will reverse bias the emitter-base junctions of the transistors 108 and 110 causing them to turn off if they were on and remain off if they were off. When the transistor 108 is turned off an approximate open circuit exists between its emitter and collector. This causes the transistor 109 to turn on because current flows from the emitter of the transistor 109 to the base of the transistor 109 through the resistors 118 and 151. When the transistor 109 is turned on, an approximate short circuit exists between its emitter and collector. Under these conditions the voltage at the terminal 150 approaches the negative supply voltage and the voltage at the terminal 143 approaches ground. An identical condition exists in the second flip flop and therefore the voltage on the terminal 155 approaches the negative supply voltage and the voltage on the terminal 159 approaches ground. The voltages at the resistors 151 and 156 are held off the negative supply by the existence of current flowing through the resistors 118, 151, 138 and 156. The voltages on the terminal 143 and on the terminal 159 are held off ground due to the voltage drop across the transistors 109 and 111 as well as the voltage drop across the resistors 129 and 141. The resistors 129 and 141 are included in the circuit to impose a slightly negative voltage at the emitters of all of the transistors to increase circuit stability. Under this reset condition output leads 153 and 161 will be positive (essentially ground voltage) to indicate the zero count or reset state.

The capacitor 115 assumes a slightly charged condition due to the slight potential at the collector of the transistor 108 and the negative return through the resistor 148. The capacitor 113 charges to the voltage which is on the collector of the transistor 109 which is near the ground level. When a signal is applied at the terminal IN, the voltage on the capacitor 115 rises. The amplitude of the voltage across the capacitor 115 is very small and therefore the voltage on the capacitor 115 will be approximately equal to the input signal. The base of the transistor 108 is not affected by this signal because the transistor 108 is turned off and the voltage on the anode of the diode 116 must exceed the voltage on the base of the transistor 108 for the transistor 108 to be biased through the diode 116. The voltage on the anode of the diode 114 is equal to the input signal amplitude plus the charge which exists across the capacitor 113. Therefore the voltage at the anode of the diode 114 is equal to the input signal plus the negative power supply voltage. This voltage will forward bias the diode 114 and cause the emitter-base junction of the transistor 109 to be reverse biased. This reverse bias turns off the transistor 109 to present essentially an open circuit from the emitter to the collector of the transistor 109. Current now flows through the resistors 126 and 134 causing the emitter-base junction of the transistor 108 to become forward biased thus turning the transistor 108 on and presenting essentially a short circuit between the emitter and the collector of the transistor 108. This short circuit prevents current from flowing through the resistor 118 and therefore holds the transistor 109 turned off. The capacitors 121 and 127 are used to provide a decreased switching time in the first flip flop during transient conditions. The voltage at the terminal 150 now approaches the ground level and the voltage at the terminal 143 approaches the negative supply voltage. When the voltage across the resistor 134 goes negative, the capacitor 133 discharges through the resistors 135, 156 and 134, and the capacitor 144 charges through the resistors 147 and 134. The values of the resistors 135 and 147 are chosen to be large enough that this charging current will not affect the state of the flip flop. Also diodes 134a and 145 prevent this current transient from effecting transistors 110 and 111. The first flip flop is now in the 1 state and the second flip flop is now in the $\bar{2}$ state, i.e., the 2-stage flip flop is in its second output state (leads 152 and 161 positive).

The capacitor 115 has now acquired a relatively large charge due to the existence of the shorted condition of the transistor 108, while the capacitor 113 has now assumed a slightly charged condition. The next input signal causes the base-emitter junction of the transistor 108 to be reverse biased thus causing the transistor 108 to be turned off. The emitter and collector of the transistor 108 will therefore present essentially an open circuit and the first flip flop as described above will change state. The voltage across the resistor 134 will essentially return to the ground state and therefore a signal will exist at the input of the second flip flop, i.e., terminal 143. The capacitor 144 was fully charged and therefore the voltage at the anode of the diode 145 will approximately be equal to the supply voltage plus the voltage charge that existed on the capacitor 144. This voltage will therefore reverse bias the emitter-base junction of the transistor 111 causing the transistor 111 to turn off. As described above, this initiates flip flop action and the second unit will change state. The existing state of the 2-stage flip flop is essentially a ground voltage on output leads 153 and 157. This represents the third output state of the 2-stage flip flop.

The third input pulse applies a voltage at the anode of the diode 114 which is equal essentially to the power supply voltage plus the amplitude of the input signal causing the transistor 109 to become reverse biased and as described above this causes the first flip flop to change state. The voltage at the terminal 150 will essentially go to ground and the voltage at the terminal 143 will essentially return to the minus supply voltage. The negative voltage at the resistor 134 will not affect the state of the second flip flop because the capacitors 133 and 144 will charge and discharge through the resistors as described above but cannot affect the stable state of the flip flop. In this position, the output leads 152 and 157 will be at essentially ground potential and this represents the fourth output state of the 2-stage flip flop.

The 2-stage flip flop can be returned to the reset condition by either applying a reset signal at reset terminal R or a fourth inut signal at input terminal IN. The fourth input signal causes the first flip flop stage to change state thus applying essentially ground potential across the resistor 134 causing the power supply voltage plus the charge across the capacitor 133 to appear at the anode of the diode 134a and therefore reverse biasing the transistor 110 and causing the second flip flop to change state. Therefore, in this condition the output lines 153 and 161 assume essentially a ground state and the 2-stage flip flop is in the reset condition. Resistors 125, 119, 124 and 146 are used to increase circuit stability and capacitors 130 and 142 are used to maintain an essentially constant voltage level at the bases of all of the transistors during transient conditions. The resistors 149, 154, 158 and 162 provide isolation between the output of the flip flops and the output leads to prevent loading of the output leads from affecting the states of the flip flops.

It is to be understood that the above description is illustrative of this invention and that various modifications thereof can be utilized without departing from its spirit and scope.

Having described the invention, we claim:

1. In a system having a cycle of operations for weighing, computing and indicating or printing a record of the value of each of a plurality of successively weighed loads, in combination, weighing mechanism, computer means for computing, in accordance with unit price and weight, the value of each weighed load, weight reading means for making weight information provided by the weighing mechanism available to the computer means, readout means electrically connected to the computer means for indicating or printing the computed value, and programmer means for programming the system and including circuit means responsive to predetermined combinations of unit price and weight for preventing value computation based on said combinations.

2. In a system in accordance with claim 1 wherein indicating means responsive to said predetermined combination is provided.

3. In a system in accordance with claim 1 wherein the circuit means includes switch means in circuit with the weight reading means and responsive to predetermined ranges of inserted unit price.

References Cited

UNITED STATES PATENTS

| | | | |
|---|---|---|---|
| 1,757,072 | 5/1930 | Boyer | 177—3 |
| 3,044,691 | 7/1962 | Allen | 177—25 X |
| 3,262,639 | 7/1966 | Karp | 177—3 X |
| 3,329,807 | 7/1967 | Currie et al. | 177—3 X |

FOREIGN PATENTS 1,024,042  3/1966  Great Britain.

RICHARD B. WILKINSON, *Primary Examiner.*

G. H. MILLER, JR., *Assistant Examiner.*

U.S. Cl. X.R.

177—50; 235—61